Patented July 2, 1940

2,206,819

UNITED STATES PATENT OFFICE 2,206,819

PROLAMIN SOLUTIONS AND METHOD OF PREPARING SAME

Jerome Martin, Terre Haute, Ind., assignor to Commercial Solvents Corporation, Terre Haute, Ind., a corporation of Maryland No Drawing. Application January 28, 1939, Serial No. 253,257

13 Claims. (Cl. 134—12)

My invention relates to solutions of prolamins, such as zein, gliadin and hordein, and to methods of preparing such solutions from purified prolamins, or from crude materials containing prolamins.

The prolamins, and especially zein, are useful as binders in adhesives, coating compositions, molding compositions and the like, and as the principal components of films, plastics, and the like. However, in the past the use of these materials has been limited by the lack of satisfactory solvents for the extraction of the prolamins from crude materials containing them, or for the preparation of solutions for the various uses enumerated above. Aqueous aliphatic alcohols have been primarily used in the past as solvents for the prolamins, but these solvents have had numerous disadvantages, such as low yields in extraction processes, tendency to form cloudy solutions, and low tolerance for other solvents or diluents.

I have now discovered that the saturated aliphatic nitroalcohols are excellent solvents for the prolamins, both for extracting these proteins from crude substances containing them, and for the preparation of prolamin solutions for various uses in the art. The nitro-alcohols for this purpose may be prepared by any of the known methods, as, for example, in accordance with the procedures of U. S. Patent 2,135,444 of B. M. Vanderbilt, or U. S. Patent 2,139,120 of H. B. Hass and B. M. Vanderbilt. Any of the saturated aliphatic nitroalcohols may be employed as the solvent in accordance with my invention, but I have found that the solubility of the prolamins decreases with increasing molecular weight of the solvent, and that branched-chain compounds and secondary alcohols tend to give lower solubilities than primary straight-chain alcohols. For these reasons I prefer to employ nitroalcohols containing less than 6 carbon atoms, and more desirably nitroalcohols containing less than 5 carbon atoms, preferably having a straight-chain, primary alcohol structure.

I have found that zein may be dissolved to the extent of 50% by weight, or more, in 2-nitroethanol, 1-nitro-2-propanol, 2-nitro-1-propanol, 2-nitro-1-butanol, 3-nitro-2-butanol, 2-nitro-1-pentanol, and 3-nitro-2-pentanol, and that solutions containing very much lower concentrations of zein can be prepared from 3-nitro-3-methyl-2-butanol, 3-nitro-2-hexanol, 2-nitro-3-hexanol, 2-nitro-2-methyl-3-hexanol, 2-nitro-4-heptanol, 3-nitro-3-methyl-4-heptanol, and 3-nitro-4-octanol.

Similarly, I have found that gliadin solutions containing more than 30% by weight of gliadin may be prepared from 2-nitroethanol, 1-nitro-2-propanol, 2-nitro-1-propanol, and 2-nitro-1-butanol, and that solutions containing very much lower concentrations of gliadin can be prepared from the remaining nitroalcohols listed above.

The nitroalcohols may be satisfactorily employed for extracting the prolamins from glutens or other crude materials containing them. For this purpose the nitroalcohols are advantageous in that they may be used in an anhydrous state, thus enabling extractions to be made where the presence of water would be undesirable, or where the water in an aqueous solvent mixture would tend to dissolve impurities together with the prolamins. On the other hand, I have found that moderate concentrations of water do not interfere with the solvent action of the nitroalcohols, but may even be distinctly advantageous, so that wet glutens or other substances containing considerable amounts of water may be extracted without the necessity for prior drying.

The following examples illustrate the use of the nitroalcohols for the extraction of zein and gliadin from corn and wheat gluten:

Example I

Separate quantities of corn gluten were extracted with various solvents, as indicated in the table below, in a ratio of approximately 1.2 gals. solvent per lb. gluten. In each case the gluten and solvent were mixed and allowed to stand overnight, at room temperature, followed by stirring for 8 hours, and separation of the resulting solution from the undissolved solids by centrifuging. The solutions obtained were filtered and poured into ether to precipitate the dissolved zein, and the zein was then washed with ether, dried and weighed. The product was in each case found to be completely soluble in 70% ethyl alcohol, and insoluble in absolute ethyl alcohol, thus identifying it as a prolamin. The following yields were secured:

| Extractant | Yield of zein, percent by weight of gluten |
|---|---|
| | Percent |
| 2-nitro-1-butanol (anhydrous) | 37 |
| 90% aqueous 2-nitro-1-butanol | 40 |
| 80% aqueous 2-nitro-1-butanol | 42 |
| 70% aqueous 2-nitro-1-butanol | 47 |
| 60% aqueous 2-nitro-1-butanol* | 43 |
| Ethanol (anhydrous) | 2 |
| 80% aqueous ethanol | 18 |
| 70% aqueous ethanol | 24 |

* Not completely miscible.

Separate quantities of wheat gluten were extracted with 2-nitro-1-butanol, and with ethanol, in the manner described above in Example I, and the resulting solutions were treated as in Example I to identify the extracted material as a prolamin, and to determine the yield. The following results were secured:

| Extractant | Yield of gliadin, percent by weight of gluten |
|---|---|
| | Percent |
| 2-nitro-1-butanol (anhydrous) | 29 |
| Ethanol (anhydrous) | 5 |

The prolamins obtained as described above, or by other methods previously used in the art, may be dissolved in nitroalcohols to form solutions of general utility. Such solutions, with or without other modifying agents, may be employed in the production of coating compositions, adhesives, plastics, molding compositions, and solutions for the production of films, extruded fibers, and the like.

The nitroalcohols of the present invention are particularly adapted as solvents for the production of coating compositions. These solvents produce brilliant, clear solutions, which deposit very satisfactory, clear adherent and durable films. The nitroalcohols have sufficiently low evaporation rates to insure adequate flow, and are suitable for the production of compositions for brush application. Solutions of the prolamins in nitroalcohols also possess a greater tolerance for other organic solvents and diluents than the prolamin solutions previously available. For example, a solution of 10 per cent. zein in 3-nitro-2-pentanol has a tolerance limit of 4 vols. of 1-butanol, 2 vols. of toluene, or 1 vol. of butyl acetate. Solutions of the prolamins in nitroalcohols likewise have satisfactory viscosities for application, zein solutions being similar in this respect to solutions of approximately equal concentrations of ½ sec. nitrocellulose.

Various other modifying agents may be incorporated in the prolamin solutions of the present invention, in accordance with prior practices with prolamin solutions in other solvents. The usual pigments and dyes may be incorporated in the solutions for coating or plastic purposes, and various plasticizers, such as the esters of hydroxy polycarboxylic acids, aromatic alkylated sulfonamides, and the like, may also be employed. Modifying agents such as aliphatic acids may be incorporated in solutions for adhesive purposes to improve the adhesive properties, and hardening or water-proofing agents, such as formaldehyde, may be incorporated in the solutions for any of the various uses in the art.

My invention may be further illustrated by the following examples:

*Example III*

100 parts by weight of powdered zein is dissolved in 800 parts by weight of a solvent mixture comprising 1 part by volume of 3-nitro-2-pentanol, and 3 parts by volume of 1-butanol. The resulting mixture constitutes a clear, brilliant solution of satisfactory viscosity for spray application, and capable of producing an adherent, transparent, and durable coating when applied to a smooth surface.

*Example IV*

100 parts by weight of powdered zein and 15 parts by weight of dibutyl tartrate are dissolved in 900 parts by weight of a solvent mixture comprising 3 parts by volume of 3-nitro-2-butanol, and 4 parts by volume of toluene, to form a clear solution suitable for coating paper, for the production of flexible films, and for similar purposes.

*Example V*

100 parts by weight of powdered gliadin is dissolved in 200 parts by weight of 1-nitro-2-propanol, to which solution is added 50 parts by weight of 40 per cent. formaldehyde solution. The resulting solution constitutes an adhesive, or a suitable binder for the production of molded products, or laminated products.

*Example VI*

100 parts by weight of zein is dissolved in 200 parts by weight of 3-nitro-2-pentanol, to which solution is added 50 parts by weight of 40 per cent. formaldehyde solution, and 10 parts by weight of glacial-acetic acid, to form a solution particularly adapted for use as an adhesive for the production of laminated glass.

*Example VII*

100 parts by weight of gliadin and 15 parts by weight of dibutyl tartrate are dissolved in 200 parts by weight of 2-nitro-1-butanol, to which solution is added 12.5 parts by weight of 40 per cent. formaldehyde, to form a solution suitable for use as binder for composition cork, or for the application of adherent, moisture-proof coatings.

*Example VIII*

100 parts by weight of zein, and 20 parts by weight of dibutyl tartrate are dissolved in 200 parts by weight of 1-nitro-2-propanol, and 50 parts by weight of 40 per cent. formaldehyde solution is then incorporated to form a solution suitable for the production of flexible water-proof films, for extrusion to produce fibers, or for the production of shrink-fit bottle caps, and the like.

It is to be understood, of course, that the above examples are illustrative only, and do not limit the scope of my invention. Useful results may also be obtained in the case of hordein, as well as zein and gliadin, and various other solvents, diluents and modifying agents could be incorporated in accordance with known practices in the art. In general, it may be said that any modifications of procedure and the use of any equivalents which would naturally occur to those skilled in the art, are included in the scope of my invention.

My invention now having been described, what I claim is:

1. A method of producing prolamin solutions, which comprises contacting prolamin-containing materials with a saturated aliphatic nitroalcohol the total water content of both the prolamin-containing material and the nitroalcohol being insufficient to cause precipitation of the dissolved prolamin.

2. A process for the extraction of prolamins from crude substances containing prolamins, which comprises subjecting such substances to the solvent action of a saturated aliphatic nitroalcohol wherein the total water content of the prolamin-containing substance and said nitroalcohol is insufficient to cause precipitation of the dissolved prolamin.

3. A composition of matter comprising a prolamin dissolved in a saturated aliphatic nitroalcohol.

4. A composition of matter comprising zein dissolved in a saturated aliphatic nitroalcohol containing less than 6 carbon atoms.

5. A composition of matter comprising gliadin dissolved in a saturated aliphatic nitroalcohol containing less than 6 carbon atoms.

6. A composition of matter comprising hordein dissolved in a saturated aliphatic nitroalcohol containing less than 6 carbon atoms.

7. A coating composition comprising a prolamin and a saturated aliphatic nitroalcohol of such character and in such proportion as to produce a solution having the property of depositing clear, adherent films when applied to surfaces.

8. A coating composition comprising zein dissolved in a saturated aliphatic nitroalcohol containing less than 6 carbon atoms, and a plasticizer.

9. A composition of matter comprising a prolamin dissolved in a saturated aliphatic nitroalcohol, and formaldehyde.

10. A composition of matter comprising zein dissolved in a saturated aliphatic nitroalcohol containing less than 6 carbon atoms, a plasticizer, and formaldehyde.

11. A composition of matter comprising gliadin dissolved in a saturated aliphatic nitroalcohol containing less than 6 carbon atoms, a plasticizer, and formaldehyde.

12. A composition of matter comprising hordein dissolved in a saturated aliphatic nitroalcohol containing less than 6 carbon atoms, a plasticizer, and formaldehyde.

13. A coating composition comprising zein and a saturated aliphatic nitroalcohol containing less than 6 carbon atoms, said nitroalcohol being present in such proportion as to produce a solution having the property of depositing clear adherent films when applied to surfaces.

JEROME MARTIN.